United States Patent
Takene et al.

(10) Patent No.: US 8,165,472 B2
(45) Date of Patent: Apr. 24, 2012

(54) APPARATUS FOR TRANSMITTING AND RECEIVING A SIGNAL IN A VISIBLE LIGHT COMMUNICATION SYSTEM

(75) Inventors: Kouichi Takene, Higashikurume (JP); Tooru Takanaka, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 522 days.

(21) Appl. No.: 12/388,566

(22) Filed: Feb. 19, 2009

(65) Prior Publication Data

US 2010/0209118 A1    Aug. 19, 2010

(51) Int. Cl.
H04B 10/00    (2006.01)

(52) U.S. Cl. .................... 398/172; 398/186

(58) Field of Classification Search .......... 398/172, 398/186
See application file for complete search history.

(56) References Cited

U.S. PATENT DOCUMENTS

| | | |
|---|---|---|
| 2006/0239689 A1 | 10/2006 | Ashdown |
| 2007/0058987 A1 | 3/2007 | Suzuki |
| 2007/0092264 A1 * | 4/2007 | Suzuki et al. ............... 398/189 |
| 2007/0242339 A1 | 10/2007 | Bradley |
| 2008/0166135 A1 | 7/2008 | Ann |
| 2010/0135676 A1 * | 6/2010 | Katagiri .................. 398/204 |

FOREIGN PATENT DOCUMENTS

| | | |
|---|---|---|
| EP | 1 912 354 | 4/2008 |
| JP | 3391204 | 1/2003 |
| JP | 2006-323766 | 11/2006 |
| JP | 2006-325085 | 11/2006 |
| KR | 10-2008-0026111 | 3/2008 |

OTHER PUBLICATIONS

European Search Report dated Jul. 7, 2009, for counterpart European Patent Application No. 09152961.

Notification for Filing Opinion mailed Aug. 23, 2010, from the Korean Patent Office for Korean Patent Application No. 10-2009-0014172 (3 pages).

* cited by examiner

*Primary Examiner* — Nathan Curs
(74) *Attorney, Agent, or Firm* — Finnegan, Henderson, Farabow, Garrett & Dunner, L.L.P.

(57) ABSTRACT

Disclosed herein is a visible light communication system, in which the visible light emitted from the light-emitting element is superposed with a signal in order to accomplish communication. The system has a transmitter and a receiver. The transmitter has a modulation circuit whose the demodulating mode can be changed during the communication in accordance with the state of the visible light. The receiver receives the visible light emitted from the transmitter and has a demodulation circuit that demodulates the modulated signal received from the transmitter.

8 Claims, 6 Drawing Sheets

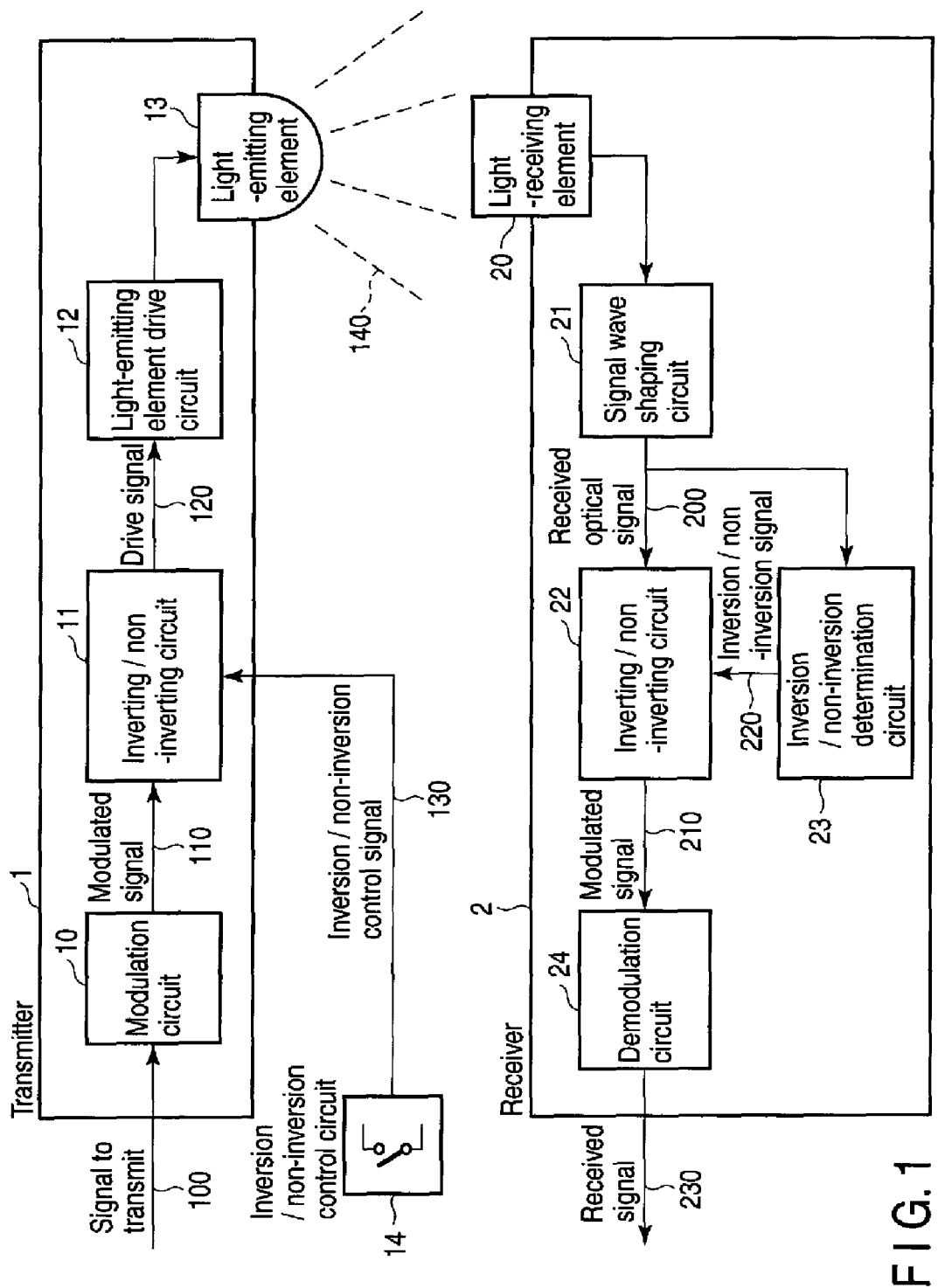
F I G. 1

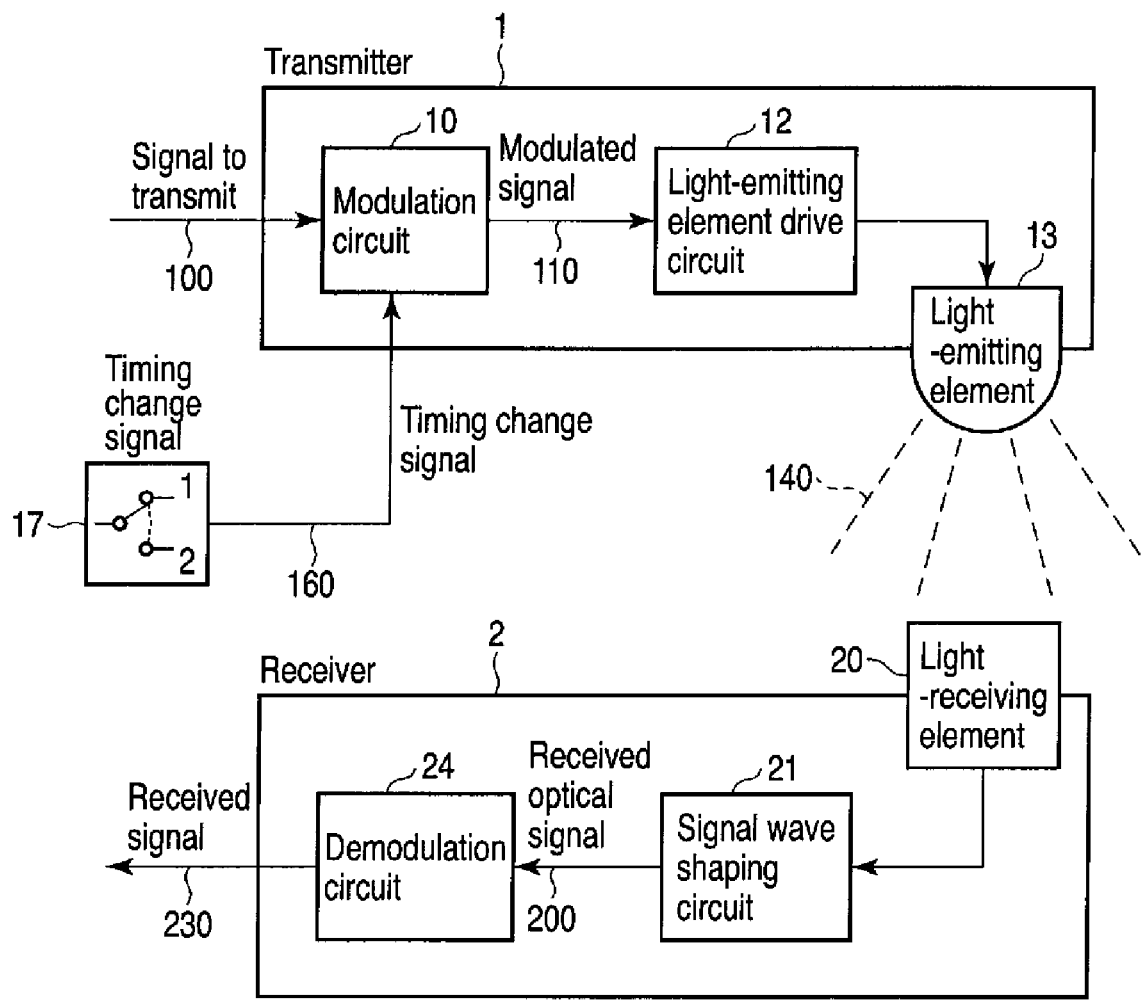
F I G. 5

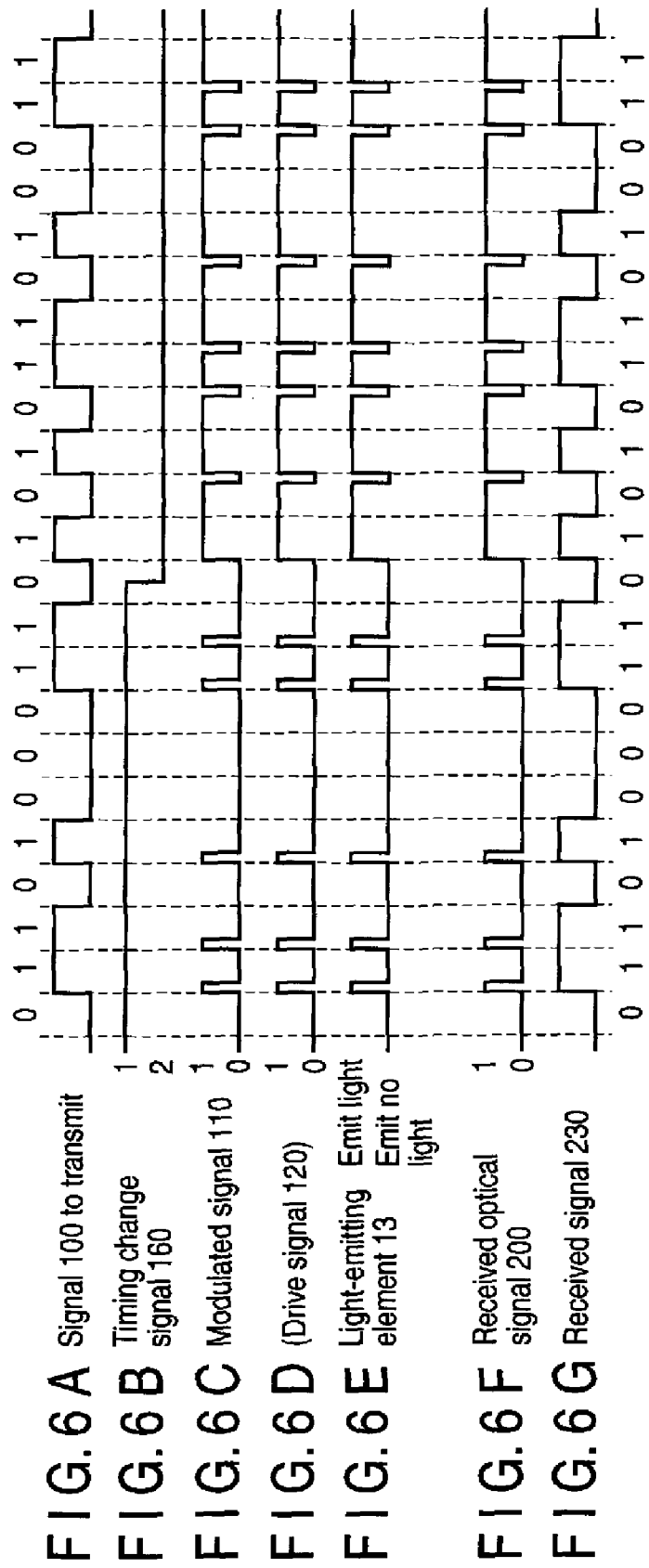

APPARATUS FOR TRANSMITTING AND RECEIVING A SIGNAL IN A VISIBLE LIGHT COMMUNICATION SYSTEM

BACKGROUND OF THE INVENTION

1. Field of the Invention

The present invention relates generally to a visible light communication system that utilizes visible light communication. More particularly, the invention relates to a visible light communication system that uses an LED.

2. Description of the Related Art

In recent years, visible light communication technology has been developed, which utilizes the visible light emitted from a light-emitting element such as a light emitting diode (LED) (see, for example, Japanese Patent No. 3391204). More specifically, it is proposed that an LED be used as light source in a transmitter and be intermittently driven at high speed, thereby to transmitting traffic information or the like to vehicles such as automobiles running on the roads.

At present, LEDs find various uses as light sources in lighting, as red-light lamps and head lamps on automobiles, as backlights in displays, as light sources in flash lamps and signaling devices.

In the visible light communication, the LED serves as light source, performing a signal-transmitting function and an object-illuminating function. Therefore, the area in which the LED can achieve visible light communication is limited to the area illuminated by the LED. This characterizes the visible light communication that covers a limited area and that can be easily recognized visually. However, the visible light communication has a problem. It does not work, while the illuminating function is not being performed.

A communication apparatus for use in vehicles, which utilizes the visible light emitted from the tail lamp on the automobile, has been proposed (see, for example, Jpn. Pat. Appln. KOKAI Publication No. 2006-323766). This communication apparatus superposes the visible light emitted from the tail lamp with signal pulses. Superposed with the signal pulses, the visible light can represent the data representing the danger level. This data is supplied to the following automobile, which receives the visible light. In this visible light communication, however, the data is transmitted only while the tail lamp remains on. While the tail lamp is off, no danger level data can be transmitted.

Such a problem arises also in visible light communication using the light coming from car head lamps or outdoor lamps. That is, the communication does not work at daylight. To solve this problem, the lamps may be kept on all time. Turning on the lamps at all times, whether necessary or not, results in another problem such as an environmental one. In the visible light communication using the car tail lamps, the tail lamps cannot be kept on all time. This is because their inherent function is to emit light to indicate that the brake is working, and to emit no light to indicate that the brake is not working.

Thus, the visible light communication available at present is performed in only a place or condition where the lamp should be always on or where the communication is unnecessary for a specific period (when the lamp is off). The lamps in any tunnel should be always on to enable the traffic information guide system to work, which employs the visible light communication. That is, the lamps are kept on, day and night, thus accomplishing visible light communication. The visible light communication is unnecessary for a specific period in, for example, an indoor system for giving people information. This is because this system is based on the assumption that the lamps remain on as long as anyone stays in the place. In other words, the visible light communication need not be achieved when no information recipients exist in the place.

Visible light communication apparatuses have been proposed, which can control the lighting by means of a pulse-width modulation (PWM) circuit (see, for example, Jpn. Pat. Appln. KOKAI Publication No. 2006-325085). Any visible light communication apparatus of this type can adjust the luminance of the light source, gradually and continuously, not step by step. Having the function of controlling the lighting, the apparatus efficiently works if used in, particularly, living rooms or shops where the atmosphere is important to people.

The visible light communication system should work, no matter whether the lamps remain on or off. This is not easy to accomplish, however. As already pointed out, the system cannot easily be provided because it needs to perform not only communication, but also the primary function of illuminating objects. (The primary function includes the function of turning the tail lamp on and off to show that the brake is working and not working, respectively). A prior-art visible light communication apparatus has been proposed, which has a lighting control function. For anyone who utilizes ordinary lighting function only, the apparatus may be hard to control and may be too expensive. As an ordinary light apparatus, it only need to assume only two states (i.e., on-state and off-state) or only three states (i.e., high-luminance on-state, and low-luminance on-state and off-state).

BRIEF SUMMARY OF THE INVENTION

An object of this invention is to provide a visible light communication system that can change the modulation mode in accordance with the state of visible light while the communication is proceeding, thereby accomplishing the visible light communication, no matter whether the lamp used is on or off.

An apparatus for transmitting a signal in visible light communication, according to an aspect of this invention, comprises: An apparatus for transmitting a signal in visible light communication, comprising: a light-emitting element configured to emit visible light; a drive signal module configured to generate modulated signals of different types from modulated signals of different types from a signal to transmit, thereby to generate a drive signal from one of the modulated signals; and a drive module configured to drive the light-emitting element in accordance with the drive signal.

An apparatus for receiving a signal in visible light communication, according to another aspect of this invention, comprises: a light-receiving element configured to receive visible light; a received optical-signal processing module configured to extract, as a received signal, a signal superposed on the visible light received by the light-receiving element; a converting module configured to convert the received signal to a modulated signal of the signal to transmit; and a demodulation module configured to demodulate the modulated signal to the signal to transmit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the major components of a visible light communication system according to a first embodiment of this invention;

FIG. 5 is a block diagram showing the major components of a visible light communication system according to a third embodiment of this invention; and FIGS. 6A to 6G are timing charts explaining the operation of the visible light communication system according to the third embodiment.

DETAILED DESCRIPTION OF THE INVENTION

Figure 2:
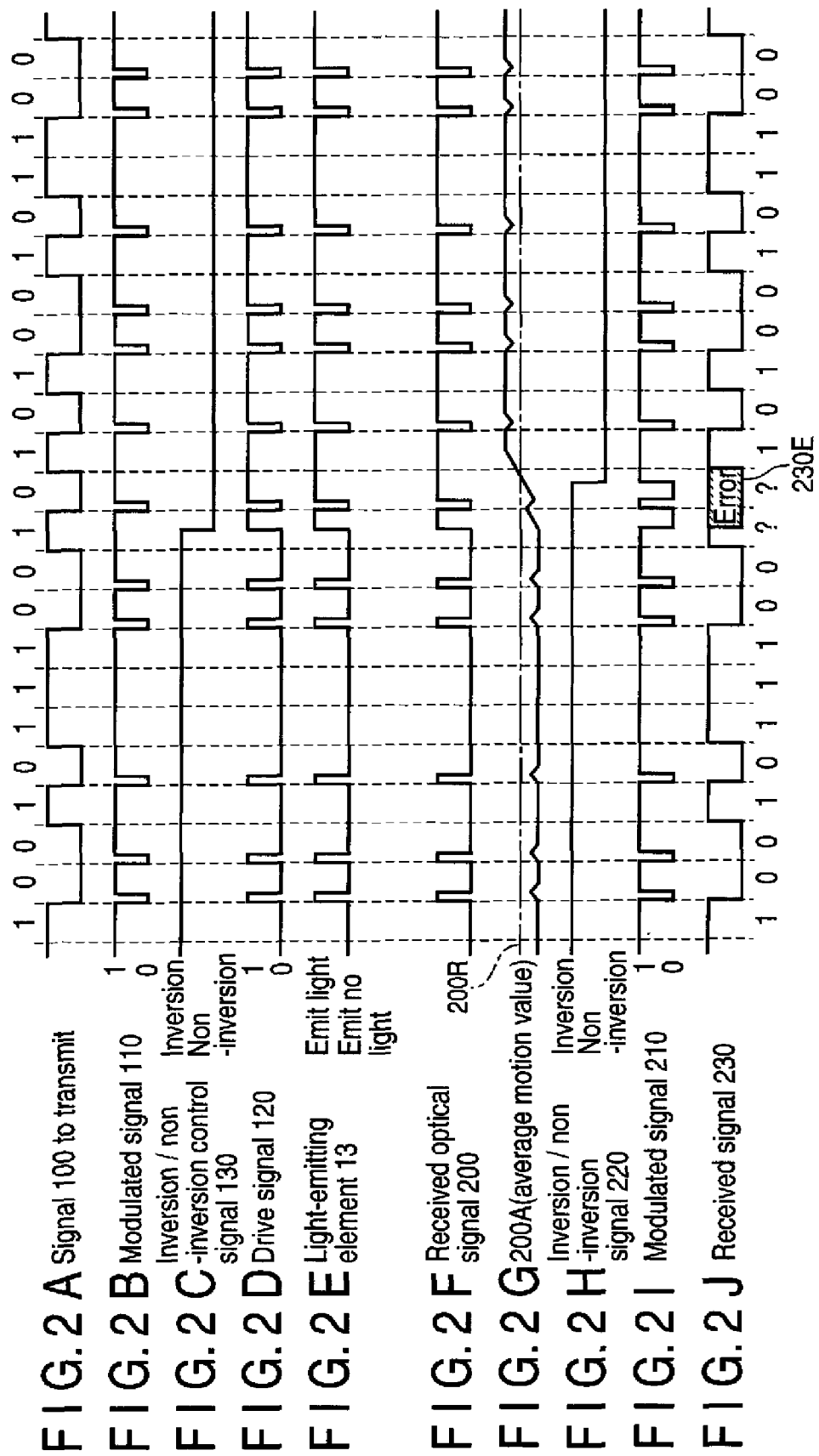
FIGS. 2A to 2J are timing charts explaining the operation of the visible light communication system according to the first embodiment.

Embodiments of the present invention will be described with reference to the accompanying drawings.

First Embodiment

FIG. 1 is a block diagram showing the major components of a visible light communication system according to a first embodiment of the present invention.

As shown in FIG. 1, the system is a combination of a transmitter 1 and a receiver 2. The transmitter 1 has a light-emitting element 13 that performs not only the function of illuminating objects, but also the function of superposing visible light 140 with a signal and then applying the visible light, thus transmitting the signal. The light-emitting element 13 is a light emitting diode (LED). When driven by a light-emitting element drive circuit 12, the light-emitting element 13 emits visible light 140 or emits no visible light.

The transmitter 1 further has a modulation circuit 10 and an inverting/non-inverting circuit 11. The modulation circuit 10 converts a signal 100 in a prescribed mode to a modulated signal 110. The signal 100 is digital data to be transmitted from the transmitter 1. Preferably, the prescribed modulating mode is such type that the signal 100 may be converted to the signal 110 having an average level that deviates from the intermediate value. More specifically, if the signal of the signal 110 falls within a range from 0 to 1, the average level should better deviate from 0.5, i.e., intermediate value. That is, the average level should deviate from 0.5 as much as possible, to, for example, 0.1 or 0.9. The present embodiment adopts a prescribed modulating mode in which the signal 110 whose average level approaches 1 as much as possible.

The inverting/non-inverting circuit 11 converts the modulated signal 110 having a level either inverted or not inverted, to a drive signal 120. Whether the signal 110 should be inverted or not is determined in accordance with an inversion/non-inversion control signal (hereinafter called a "control signal") 130 output from an inversion/non-inversion control circuit 14. The inversion/non-inversion control circuit 14 is a switch circuit that causes the light-emitting element 13 to emit visible light 140 or emits no visible light.

Thus, since the light-emitting element 13 performs not only a signal-transmitting function, but also an object-illuminating function, in this embodiment, it is turned on when the switch circuit is closed and is turned off when the switch circuit is opened. The inversion/non-inversion control circuit 14 may of course be a switch circuit that is independent of such a switch circuit.

On receiving the drive signal 120 output from the inverting/non-inverting circuit 11, the light-emitting element drive circuit 12 drives the light-emitting element 13. More precisely, the light-emitting element drive circuit 12 turns on the light-emitting element 13 while the drive signal 120 remains at level 1, and turns off the light-emitting element 13 while the drive signal 120 remains at level 0.

While turned on, the light-emitting element 13 keeps emitting visible light 140. The visible light 140 emitted from the light-emitting element 13 is superposed with the signal 100 that should be transmitted. The transmitter 1 can transmit the signal 100. As described above, the light-emitting element 13 illuminate objects, too, because it keeps emitting visible light 140 while turned on.

On the other hand, the receiver 2 has a light-receiving element 20, a signal waveshaping circuit 21, an inverting/non-inverting circuit 22, an inversion/non-inversion determination circuit 23, and a demodulation circuit 24. The light-receiving element 20 receives the visible light emitted from the light-emitting element 13 and converts the same into an electric signal (hereinafter called a "received optical signal").

The signal waveshaping circuit 21 changes the waveform of the received optical signal output from the light-receiving element 20 so that the signal may be well demodulated in the demodulation circuit 24. To be more specific, the signal waveshaping circuit 21 functions as an amplifier that amplifies the weak signal output from the light-receiving element 20, and as a filter that removes noise from the signal.

The inverting/non-inverting circuit 22 receives the received optical signal 200 output from the signal waveshaping circuit 21. The circuit 22 then converts the received optical signal 200 having a level either inverted or not inverted, to a modulated signal 210. Whether the signal 200 should be inverted or not is determined in accordance with an inversion/non-inversion signal 220 output from the inversion/non-inversion determination circuit 23. How the inversion/non-inversion determination circuit 23 performs its function will be explained later.

The demodulation circuit 24 receives the modulated signal 210 from the inverting/non-inverting circuit 22 and demodulates the modulated signal 210 to convert the same back to the signal 100. The receiver 2 outputs the signal 100 as received signal 230.

(Operation of the System)

How the visible light communication system according to this embodiment operates will be explained, with reference to the timing chart of FIGS. 2A to 2J.

First, the transmitter 1 receives a digital signal 100 via a network such as a LAN, which is either wired network or wireless network. In the transmitter 1, the light-emitting element 13 emits visible light 140 that is superposed with the signal 100. The light-emitting element 13 thus performs the signal transmitting function of the transmitter 1. In addition, the element 13 performs an illuminating function in facility.

On the other hand, the receiver 2 receives the visible light 140 and then outputs a received signal 230 generated by demodulating the signal 100 as described later. The received signal 230 is output to, for example, a personal computer or a mobile terminal. Both the transmitter 1 and the receiver 2 uses the visible light 140, accomplishing data communication between, for example, a server and a mobile terminal that are connected by the network. How the system operates will be explained below in more detail.

In the transmitter 1, the modulation circuit 10 converts the signal 100 to a modulated signal 110. As shown in FIG. 2B, the signal 110 has one of two levels, 0 and 1. The signal 110 has been modulated in such a mode that its average value is very close to 1.

The inverting/non-inverting circuit 11 outputs the modulated signal 110 having a level either inverted or not inverted, as drive signal 120. The inverting/non-inverting circuit 11 determines whether the signal 110 should be inverted or not is determined, in accordance with the inversion/non-inversion control signal 130 output from the inversion/non-inversion control circuit 14. The circuit 14 is a switch circuit that causes the light-emitting element 13 to emit visible light 140 or emit no visible light. In this embodiment, the inversion/non-inversion control circuit 14 outputs an inversion/non-inversion control signal 130 when, for example, the switch is turned off to make the element 13 emit no light.

When the switch is turned off to make the element 13 emit no light, the inversion/non-inversion control circuit 14 outputs an inversion/non-inversion control signal 130 indicating inversion, as shown in FIG. 2C, causing the inverting/non-inverting circuit 11 to turn on the light-emitting element 13. When the switch is turned on to make the element 13 emit light, the inversion/non-inversion control circuit 14 outputs an inversion/non-inversion control signal 130 indicating non-inversion, as shown in FIG. 2C. In response to the inversion/non-inversion control signal 130 indicating non-inversion, the inverting/non-inverting circuit 11 outputs a drive signal 120 inverted in terms of level with respect to the modulated signal 110.

The light-emitting element drive circuit 12 drives the light-emitting element 13 in accordance with the drive signal 120 output from the inverting/non-inverting circuit 11. More specifically, as shown in FIG. 2D, the light-emitting element drive circuit 12 makes the light-emitting element 13 emit light while the drive signal 120 remains at level 1 and emit no light while the drive signal 120 remains at level 0.

In a greater part of the period the inverting/non-inverting circuit 11 is outputting an inverted drive signal 120, the light-emitting element 13 emits no light. In the remaining part of this period, the light-emitting element 13 emits light, but for so short a time that the eye cannot detect the light. The element 13 therefore appears as if it emitted no light at all.

By contrast, in a greater part of the period the inverting/non-inverting circuit 11 is outputting a non-inverted drive signal 120, the light-emitting element 13 emits light. In the remaining part of this period, the light-emitting element 13 emits no light, but for so short a time that the eye cannot detect that no light is emitted momentarily. The element 13 therefore appears as if it kept emitting light.

The receiver 2 receives the visible light 140 emitted from the light-emitting element 13 of the transmitter 1. More precisely, the light-receiving element 20 receives the visible light 140 and converts the light 140 into a received optical signal. Then, the signal waveshaping circuit 21 processes the received optical signal output from the light-receiving element 20, generating a received optical signal 200. In this embodiment, the inversion/non-inversion determination circuit 23 determines, from the signal 200, whether the modulated signal 110 has its level inverted or not, before the demodulation circuit 24 demodulates the signal 210 back to the digital signal 100.

More specifically, the inversion/non-inversion determination circuit 23 calculates the average motion value 200A of the received optical signal 200. If the average motion value 200A is smaller than an intermediate value 200R, the circuit 23 determines that the received optical signal 200 has been inverted. If the average motion value 200A is equal to or larger than the intermediate value 200R, the circuit 23 determines that the received optical signal 200 has not been inverted. Alternatively, the inversion/non-inversion determination circuit 23 may determine whether the signal 200 has been inverted or not. In this method, the received optical signal 200 is input to a low-pass filter (LPF), and the level 1 the signal 200 has before passing the LPF is compared with the level 2 the signal has after passing through the LPF. If the rate of L1<L2 is high, the received optical signal 200 is regarded as inverted. If the rate of L1>L2 is high, the received optical signal 200 is regarded as not inverted.

In this embodiment, the inversion/non-inversion determination circuit 23 uses the first method to determine whether the level of the signal 200 has been inverted. Whether the first method or the second method is used, a reception error 230E may be made, as shown in FIG. 2J, for some time after the circuit 23 outputs the inversion/non-inversion signal 220, because the circuit 23 needs some time to make a decision. Nonetheless, the visible light communication system is designed to cope with reception errors that may result from changes in the amount of light other than the light the light source emits to achieve visible light communication. Hence, the reception error 230E and some other reception errors that may occur in this embodiment are not so problematical in the present embodiment. Like any other communication system, the visible light communication system incorporates various error detection functions and various error correction functions to cope with possible reception errors.

As the switch is repeatedly turned on and off, making the element 13 emit light and no light frequently, the control signal 120 may be continuously and frequently inverted and not inverted alternately. In this case, more reception errors will occur than permitted. Nonetheless, the possibility of this happening is extremely low in practice.

The inverting/non-inverting circuit 22 inverts the received optical signal 200 to a modulated signal 210, while inverting or not inverting the level of the signal 200. The demodulation circuit 24 receives the modulated signal 210 from the inverting/non-inverting circuit 22 and demodulates the same back to the digital signal 100. The receiver 2 outputs the digital signal 100 as received signal 230. At this point, the reception error 230E contained in the received signal 230 and resulting from the switching of the inversion/non-inversion signal 220 is restored by the various error detection functions and the error correction functions.

Configured as described above, the visible light communication system need not undergo such a complex control as the luminance control of the light source. The system can therefore perform visible light communication, whether the light source is turned on or off. The visible light communication system according to this embodiment can therefore be used at low cost and in various fields, anywhere the light-emitting element 13 is used, both illuminating objects and transmitting information. A state of "emitting no light" means that light, even if emitted, cannot be perceived by the eye.

Second Embodiment

Figure 3:
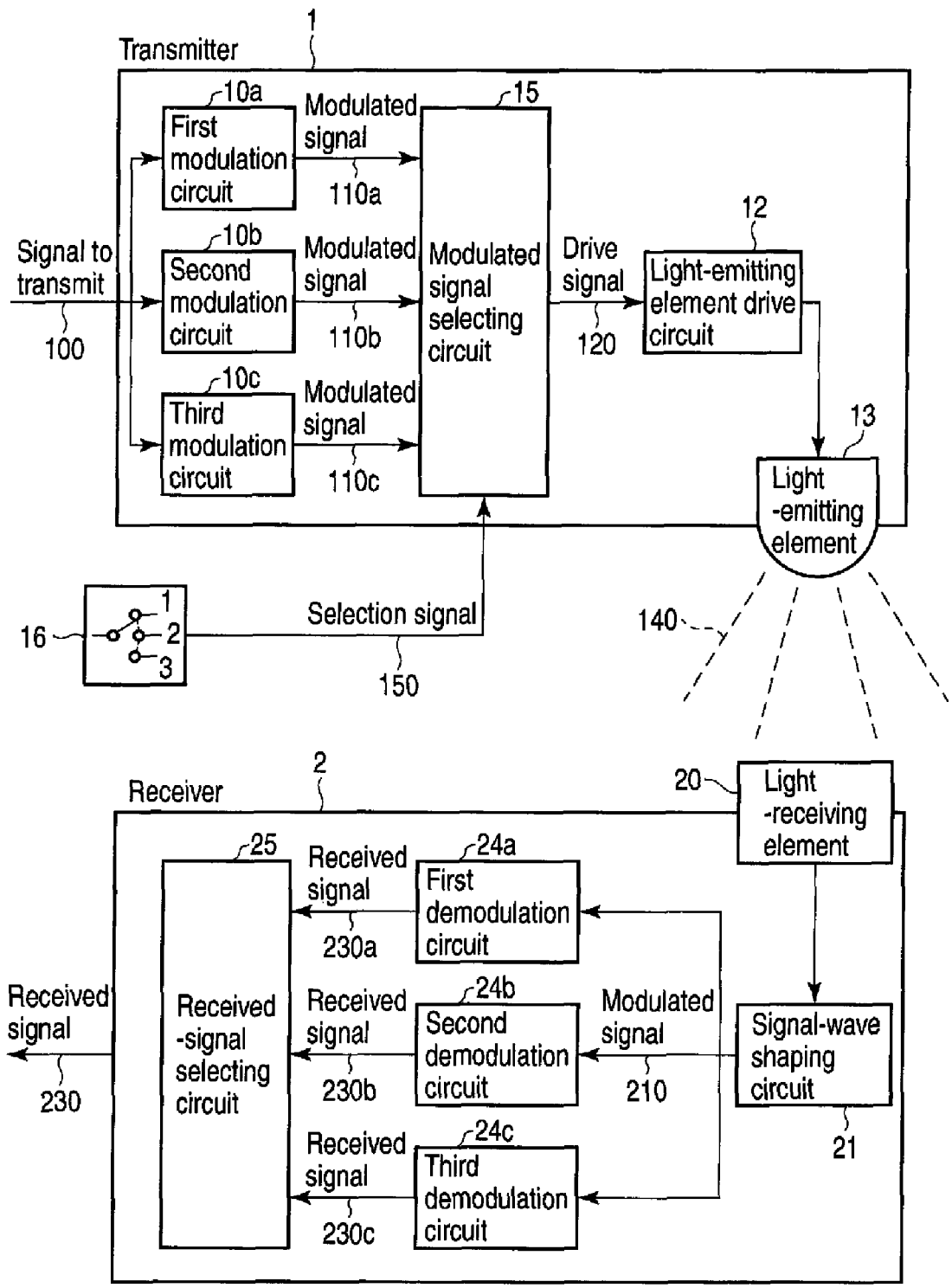
FIG. 3 is a block diagram showing the major components of a visible light communication system according to a second embodiment of this invention.

FIG. 3 is a block diagram showing the major components of a visible light communication system according to a second embodiment of this invention.

The components similar or identical to those of the visible light communication system (FIG. 1) according to the first embodiment are designated by the same reference numbers and will not be described.

In the visible light communication system according to this embodiment, the transmitter 1 has first to third modulation circuits 10a to 10c and a modulated-signal selecting circuit 15. The first to third modulation circuits 10a to 10c convert a digital signal 100 that should be transmitted, in different modulating modes. In other words, the first to third modulation circuits 10a to 10c convert the digital signal 100 to three modulated signals 110a to 110c.

Preferably, the first to third modulation circuits 10a to 10c should convert the digital signal 100 to modulated signals 110a to 110c that have different average values. More precisely, if each signal may have a level ranging from 0 to 1, the first modulation circuit 10a should output signals having an average value that is very close to 0, such as 0.1. The second modulation circuit 10b should output signals having an average value that is very close to 0.5. The third modulation circuit 10c should output signals having an average value that is very close to 1, such as 0.9. This embodiment is based on the assumption that the signals 110a to 110c are modulated, having a level ranging from 0 to 1, and having different average values.

The modulated-signal selecting circuit 15 selects one of the modulated signals 110a to 110c and outputs the selected signal as drive signal 120. That is, the modulated-signal selecting circuit 15 receives a selection signal 150 from a modulated-signal designating circuit 16 and selects the signal 110a, 110b or 110c in accordance with the selection signal 150. The modulated-signal designating circuit 16 is configured to output the selection signal 150, when it operates in interlock with a switch circuit that can turns on and off the light-emitting element 13 or can make the element 13 emit high-luminance light or low-luminance light.

Figure 4:
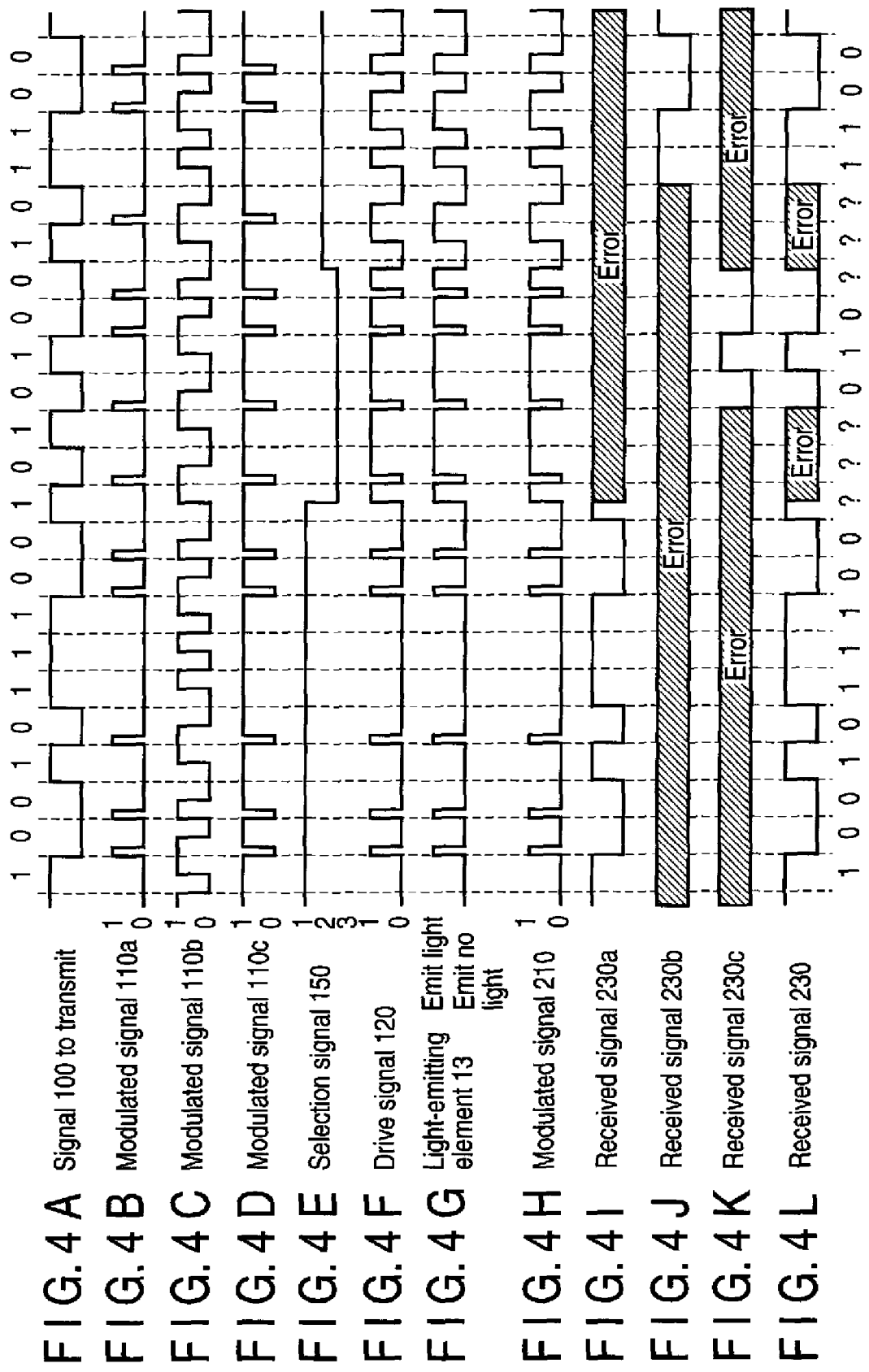
FIGS. 4A to 4L are timing charts explaining the operation of the visible light communication system according to the second embodiment.

The light-emitting element drive circuit 12 drives the light-emitting element 13 in accordance with the drive signal 120 output from the modulated-signal selecting circuit 15. More specifically, as shown in FIG. 4F, the light-emitting element drive circuit 12 makes the light-emitting element 13 emit light while the drive signal 120 remains at level 1 and emit no light while the drive signal 120 remains at level 0.

The receiver 2 has first to third demodulation circuits 24a to 24c and a received-signal selecting circuit 25, in addition to the light-receiving element 20 and signal waveshaping circuit 21. The light-receiving element 20 receives the visible light 140 emitted from the light-emitting element 13 and converts the light 140 into a received optical signal. The signal waveshaping circuit 21 processes the received optical signal output from the light-receiving element 20, generating a modulated signal 210 that can be well processed by first to third demodulation circuits 24a to 24c. (The signal 210 has the same waveform as the drive signal 120).

The first to third demodulation circuits 24a to 24c demodulate the modulated signal 210 to first to third received signals 230a to 230c. Note that the first to third demodulation circuits 24a to 24c are associated with the first to third modulation circuits 10a to 10c, respectively. The received-signal selecting circuit 25 selects one of the first to third received signals 230a to 230c. The received signal selected is output as received signal 230 from the receiver 2.

As will be described later, the received-signal selecting circuit 25 selects one of the received signals 230a to 230c, which contains more reception errors than permitted, and outputs the signal, thus selected, as received signal 230.

(Operation of the System)

How the visible light communication system according to this embodiment operates will be explained, with reference to the timing chart of FIGS. 4A to 4L.

As in the first embodiment, the transmitter 1 receives such a digital signal 100 as shown in FIG. 4A, through a network such as a LAN that is either a wired network or a wireless network. In the transmitter 1, the light-emitting element 13 emits visible light 140 that is superposed with the signal 100. The light-emitting element 13 thus performs the signal transmitting function of the transmitter 1. The light-emitting element 13 performs an illuminating function as well, in facility.

The receiver 2 receives the visible light 140. The receiver 2 outputs a received signal 230 as described above. The received signal 230 is output to, for example, a personal computer or a mobile terminal. Both the transmitter 1 and the receiver 2 utilizes the visible light 140, accomplishing data communication between, for example, a server and a mobile terminal that are connected by the network. How the system operates will be explained below in more detail.

In the transmitter 1, the first to third modulation circuits 10a to 10c converts the digital signal 100 to such modulated signals 110a to 110a as shown in FIG. 4B to 4D, respectively. The modulated-signal selecting circuit 15 selects one of the modulated signals 110a to 110a in accordance with the selection signal 150. The modulated signal selected, signal 110a, 110b or 110c, is output as drive signal 120 to the light-emitting element drive circuit 12.

The modulated-signal designating circuit 16 outputs the selection signal 150, operating in interlock with the switch circuit that can turns on and off the light-emitting element 13 or can make the element 13 emit high-luminance light or low-luminance light. More specifically, the modulated-signal selecting circuit 15 selects the modulated signal 110a in response to the selection signal 150 output while the element 13 is emitting no light (while the signal 150 remains at level 1 as shown in FIG. 4E). More precisely, the light-emitting element 13 emits light for only a very short time during this period. Since the period during which the element 13 emits light is extremely short, the light cannot be perceived by the eye. Hence, the light-emitting element 13 does not work as illumination device during this period.

In response to the selection signal 150 output while the element 13 is emitting high-luminance light (while the signal 150 remains at level 3 as shown in FIG. 4E), the modulated-signal selecting circuit 15 selects the modulated signal 110c and outputs the same as drive signal 120. During this period, the element 13 is emitting high-luminance light for a long time and emitting no light for a very short time. Hence, the light-emitting element 13 appears to the eye as if perfectly working as illumination device.

In response to the selection signal 150 output while the element 13 is emitting low-luminance light (while the signal 150 remains at level 2 as shown in FIG. 4E), the modulated-signal selecting circuit 15 selects the modulated signal 110b and outputs the same as drive signal 120. During this period, the element 13 repeatedly and alternately emits light and no light, the time it emits light each time being almost equal to the time it emits no light each time. Therefore, the time the element 13 emits light and the time the element 13 emits no light are so short that the eye cannot recognize that the element 13 is repeatedly and alternately on and off. To the eye, the element 13 appears as if emitting light at half the luminance.

In the receiver 2, the light-receiving element 20 receives the visible light 140 emitted from the light-emitting element 13 and converts the light 140 into a received optical signal. The signal waveshaping circuit 21 processes the received optical signal, generating a modulated signal 210 (shown in FIG. 4H) that corresponds to the drive signal 120.

The first to third demodulation circuits 24a to 24c demodulate the modulated signal 210 to first to third received signals 230a to 230c, which are output to the received-signal selecting circuit 25. The received-signal selecting circuit 25 selects one of the first to third received signals 230a to 230c. The received signal selected is output as received signal 230 that corresponds to the digital signal 100 supplied to the transmitter 1.

The first to third demodulation circuits 24a to 24c strictly examine when the demodulated signal 210 changes in level. If the level of the signal 210 changes when it should not or fails to change when it should, the demodulation circuits 24a to 24c determine that the signal 210 is erroneous. The data representing this decision is embedded in the received signals 230a to 230c as is illustrated in FIGS. 4I to 4K.

The received-signal selecting circuit 25 selects any received signal that is not erroneous, from the first to third received signals 230a to 230c. The received signal selected is output as received signal 230. In the received signal 230, the time at which the demodulated signal 210 delays with respect to the selection signal 150. A reception error may inevitably be made. This reception error is not so problematical in practice, nevertheless, because the visible light communication system incorporates, as pointed out above, various error detection functions and various error correction functions to cope with possible reception errors. As shown in FIG. 4E, the selection signal 150 is switched twice, each time within a short time. This switching is nothing more than an exemplary method.

Another method that the received-signal selecting circuit 25 may use is to select a received signal is to determine whether an error has occurred in the received signals 230a to 230c, from the error detection redundant code contained in the digital signal 100. Of the received signals 230a to 230c, one may have no errors. Then, the received-signal selecting circuit 25 selects the signal having no errors, as received signal 230.

As shown in FIG. 4E, the selection signal 150 for selecting a modulated signal can be changed, in level, to level 1, level 3 and level 2 in the order they are mentioned. This means that the modulated-signal selecting circuit 15 first selects the modulated signal 110a output from the first modulation circuit 10a, then the modulated signal 110c output from the third modulation circuit 10c, and finally the modulated signal 110b output from the second modulation circuit 10b. Thus, the operating state of the light-emitting element 13 is switched, first to the no-light emitting state, then to the high-luminance light emitting state, and finally to the low-luminance light emitting state.

As described above, the visible light communication system according to this embodiment need not undergo such a complex control as the luminance control of the light source, either, and can therefore perform visible light communication, whether the light source is turned on or off. The visible light communication system according to this embodiment can therefore be used at low cost and in various fields, anywhere the light-emitting element 13 is used, both illuminating objects and transmitting information.

Third Embodiment

FIG. 5 is a block diagram showing the major components of a visible light communication system according to a third embodiment of this invention.

The components similar or identical to those of the visible light communication system (FIG. 1) according to the first embodiment are designated by the same reference numbers and will not be described.

In the visible light communication system according to this embodiment, the transmitter 1 has a modulation circuit 10 and a light-emitting element drive circuit 12 as illustrated in FIG. 5. The modulation circuit 10 converts a signal 100 in a prescribed mode to a modulated signal 110. The signal 100 is digital data to be transmitted from the transmitter 1. The modulated signal 110 generated by the modulation circuit 10 has a leading edge and a trailing edge that shift as shown in FIG. 6B and FIG. 6C in accordance with a timing change signal 160 output from a timing changing circuit 17. The timing changing circuit 17 is configured to generate the timing change signal 160 in interlock with the switch circuit that turns on and off the light-emitting element 13.

The light-emitting element drive circuit 12 drives the light-emitting element 13 in accordance with the modulated signal 110 output from the modulation circuit 10 and used as a drive signal (120). More specifically, the light-emitting element drive circuit 12 makes the light-emitting element 13 emit light while the drive signal 120 remains at level 1 and emit no light while the drive signal 120 remains at level 0, as is illustrated in FIGS. 6D and 6E. While on, the light-emitting element 13 emits visible light 140 that is superposed with the signal 100. Thus, the light-emitting element 13 performs both a signal transmitting function and an object-illuminating function.

On the other hand, the receiver 2 has a light-receiving element 20, a signal waveshaping circuit 21, and a demodulation circuit 24. The light-receiving element 20 receives the visible light emitted from the light-emitting element 13 and converts the same into a received optical signal. The signal waveshaping circuit 21 changes the waveform of the received optical signal output from the light-receiving element 20 so that the signal may be well demodulated in the demodulation circuit 24. To be more specific, the signal waveshaping circuit 21 functions as an amplifier that amplifies the weak signal output from the light-receiving element 20, and as a filter that removes noise from the signal. The demodulation circuit 24 demodulates the signal 100 at the leading edge and trailing edge of the received optical signal 200. The receiver 2 outputs the signal 100 thus demodulated, as received signal 230.

(Operation of the System)

How the visible light communication system according to this embodiment operates will be explained, with reference to the timing chart of FIGS. 6A to 6G.

As in the first embodiment, the transmitter 1 receives a digital signal 100 via a network such as a LAN, which is either wired network or wireless network. In the transmitter 1, the light-emitting element 13 emits visible light 140 superposed with the signal 100. The light-emitting element 13 thus performs the signal transmitting function of the transmitter 1. The light-emitting element 13 performs an illuminating function, too, in facility.

On the other hand, the receiver 2 receives the visible light 140. The receiver 2 outputs a received signal 230 that has been generated by demodulating the signal 100 as described later. The received signal 230 is output to, for example, a personal computer or a mobile terminal. Both the transmitter 1 and the receiver 2 utilizes the visible light 140, achieving data communication between, for example, a server and a mobile terminal that are connected by the network. How the system operates will be explained below in more detail.

In the transmitter 1, the modulation circuit 10 converts the signal 100 to a modulated signal 110. The modulated signal 110 has a leading edge that is fixed and a trailing edge that shifts in accordance with the timing change signal 160 output from the timing changing circuit 17

In the present embodiment, the timing changing circuit 17 generates [[a]] the timing change signal 160 in interlock with the switch that turns on and off the light-emitting element 13. For example, when the switch is turned off, causing the element 13 to stop emitting light, the timing changing circuit 17 outputs the timing change signal 160 that indicates level 1 as shown in FIG. 6B. Alternatively, when the switch is turned on, causing the element 13 to emit light, the timing changing circuit 17 outputs the timing change signal 160 that indicates level 2 as shown in FIG. 6B. Note that level 2 is the inversion of level 1.

To be more specific, when the signal 100 to transmit is at level 1, the modulated signal 110 changes from level 0 to level 1. The modulated signal 110 changes from level 0 to level 1 only when the signal 100 is at level 1. At any other time, the modulated signal 110 remains at a fixed level and is therefore synchronous with the signal 100 to transmit.

By contrast, the timing at which the modulated signal 110 changes from level 0 to level 1 is variable. The timing is determined by the timing change signal 160 output from the timing changing circuit 17. While the timing change signal 160 remains at level 1 (see FIG. 6B), the modulated signal 110 changes from level 1 to level 0 upon lapse of a preset short time after the time the modulated signal 110 has changed from level 0 to level 1. On the other hand, while the timing change signal 160 remains at level 2, the modulated signal 110 changes from level 1 to level 0 upon lapse of a preset short time immediately before the time the modulated signal 110 changes from level 0 to level 1 for the next time.

As a result, the timing change signal 160 output from the timing changing circuit 17 has the function of changing the average level of the modulated signal 110. That is, when the timing change signal 160 is at level 1, the modulated signal has an average value that is close to 0. When the timing change signal 160 is at level 2, the modulated signal has an average value that is close to 1.

The light-emitting element drive circuit 12 receives the modulated signal 110 as drive signal (120) and drives the light-emitting element 13 in accordance with the drive signal 120. The light-emitting element 13 emits light while the modulated signal 110 remains at level 1, and emits no light while the modulated signal 110 remains at level 0.

During the period the timing change signal 160 is at level 1, the light-emitting element 13 emits light for a short time. In other words, the light-emitting element 13 emits no light for a greater part of that period. The time the element 13 emits light is so short that the eye cannot recognizes the emission of light. In this case, the light-emitting element 13 appears as if not emitting light at all. On the other hand, during the period the timing change signal 160 is at level 2, the light-emitting element 13 emits light for a long time. That is, the light-emitting element 13 emits no light for a very short time. The time the element 13 emits no light is so short that the eye cannot recognizes the emission of no light. In this case, the light-emitting element 13 appears as if emitting light all time the signal 160 remains at level 2.

Next, the receiver 2 receives the visible light 140 emitted from the light-emitting element 13 of the transmitter 1 as shown in FIG. 6F. More precisely, the light-receiving element 20 receives the visible light 140 and converts the same into a signal. This signal is supplied to the signal waveshaping circuit 21. The circuit 21 processes the signal, generating a received optical signal 200 that corresponds to the modulated signal 110 (drive signal 120).

The demodulation circuit 24 demodulates the received optical signal 200, generating a received signal 230 that corresponds to the signal 100 to transmit. That is, as shown in FIG. 6G, the demodulation circuit 24 outputs a received signal 230 at level 1 when the received optical signal 200 changes from level 0 to level 1, and outputs a received signal 230 at level 0 at any other time. In the case shown in FIG. 6A to 6G, the timing change signal 160 is changed from level 1 to level 2. This level switching changes the timing at which the modulated signal 110 changes from level 1 to level 0. As a result, the light-emitting element 13 starts emitting light, as can be perceived by the eye. Not influenced by the state of emitting light or the state of emitting no light, the demodulation circuit 24 outputs a normal received signal 230.

The visible light communication system according to this embodiment need not undergo such a complex control as the luminance control of the light source, either, and can therefore perform visible light communication, whether the light source is turned on or off. The visible light communication system according to this embodiment can therefore be used at low cost and in various fields, anywhere the light-emitting element 13 is used for both illuminating objects and transmitting information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for transmitting a signal in visible light communication, comprising:
a light-emitting element configured to emit visible light, the light-emitting element including an illuminating function;
a timing-changing module configured to output a first timing changing signal in accordance with turning off of a switch and output a second timing changing signal in accordance with turning on of the switch, the switch being provided for turning on and off the light-emitting element;
a modulation module configured to modulate the signal to transmit in accordance with the first and second timing changing signals and output first and second modulated signals;
a drive module configured to drive the light-emitting element in accordance with the first and second modulated signals, wherein
the modulation module is configured to output the first modulated signal in accordance with the first timing changing signal and the second modulated signal in accordance with the second timing changing signal, the first modulated signal changing to a first logical level in accordance with the first logical level of the signal to transmit and to a second logical level from the first logical level by a fixed timing, the second modulated signal changing to a first logical level in accordance with the first logical level of the signal to transmit and to a second logical level from the first logical level by a variable timing.

2. The apparatus according to claim 1, wherein the timing-changing module fixes a leading edge of the first and second modulated signals and shifts the trailing edge of the first and second modulated signals.

3. An apparatus for receiving the signal in visible light transmitted from the apparatus according to claim 1, comprising:
- a light-receiving element configured to receive the visible light;
- a received optical-signal processing module configured to extract, as the received signal, a signal superposed on the visible light received by the light-receiving element;
- a converting module configured to convert the received signal to a modulated signal of the signal to transmit; and
- a demodulation module configured to demodulate the modulated signal to the signal to transmit.

4. The apparatus according to claim 3, wherein the converting module comprises:
- a determination module configured to determine whether the received signal has been inverted in terms of level; and
- an output module configured to convert the received signal to a modulated signal having a level inverted if the received signal has been inverted or having a level not inverted if the received signal has not been inverted.

5. The apparatus according to claim 3, wherein the demodulation module is configured to demodulate the signal to transmit, in accordance with a trailing edge of the received optical signal.

6. The apparatus according to claim 1, wherein the modulation module is configured to output the second modulated signal changing to a second logical level from the first logical level by a timing before changing the first logical level in accordance with the first logical level of a next signal to transmit.

7. An apparatus for receiving a signal in visible light communication, comprises:
- a light-receiving element configured to receive visible light;
- a received optical-signal processing module configured to extract, as a received signal, a signal superposed on the visible light received by the light-receiving element;
- a converting module configured to convert the received signal to a modulated signal of the signal to transmit; and
- a demodulation module configured to demodulate the modulated signal to the signal to transmit,
- wherein the demodulation module demodulates the received optical signal in a plurality of demodulating modes associated with a plurality of modulating modes, thereby generating and outputting a plurality of signals as received signals, and further comprises a selection module configured to select and output any one of the signals generated by the demodulation module.

8. An apparatus for receiving a signal in visible light communication, comprises:
- a light-receiving element configured to receive visible light;
- a received optical-signal processing module configured to extract, as a received signal, a signal superposed on the visible light received by the light-receiving element;
- a converting module configured to convert the received signal to a modulated signal of the signal to transmit; and
- a demodulation module configured to demodulate the modulated signal to the signal to transmit,
- wherein the demodulation module demodulates the received optical signal in a plurality of demodulating modes associated with a plurality of modulating modes, thereby generating and outputting a plurality of signals as received signals, and further comprises a selection module configured to select and output any one of the signals generated by the demodulation module, and
- wherein the selection module selects and outputs one of the received signals demodulated by the demodulation module, which includes errors.

* * * * *